Patented Nov. 29, 1938

2,138,223

UNITED STATES PATENT OFFICE 2,138,223

POLYMETHINE DYES

Gustav Wilmanns, Wolfen, Kreis Bitterfeld, and Wilhelm Schneider, Dessau, Germany, assignors to Agfa Ansco Corporation, Binghamton, N. Y., a corporation of New York No Drawing. Application October 20, 1936, Serial No. 106,566. In Germany October 31, 1935

8 Claims. (Cl. 260—240)

Our present invention relates to the manufacture of dyes of the polymethine series.

One of its objects is a process of manufacturing new dyes of the polymethine series. Other objects are the new dyes. Further objects will be seen from the detailed specification following hereafter.

This invention relates to the manufacture of valuable polymethine dyestuffs by condensing an ortho-ester of an organic acid or a substance which reacts like an ortho-ester with a compound of the general formula

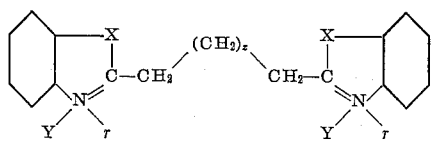

in which
X=oxygen, sulphur or selenium,
Y=halogen or any acid residue,
z=a whole number from 1 to 6,
r=alkyl.

Compounds of the aforesaid formula are made by subjecting together to distillation an ortho-aminophenol, an ortho-aminothiophenol or an ortho-aminoselenophenol and a di-basic aliphatic acid, for instance adipic acid or pimelic acid.

The dyestuffs obtained by this process may be supposed to have the formula

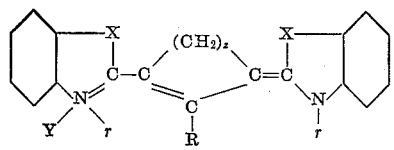

in which
X=oxygen, sulphur or selenium,
Y=halogen or any desired acid residue,
z=a whole number from 1 to 6,
r=H, alkyl,
R=alkyl or aryl.

The dyestuffs are carbocyanines in which the heterocyclic ring systems are connected not by a straight chain of methine groups, but by a cyclic chain. These new dyestuffs are especially useful as sensitizers and filter dyestuffs for photography.

The following examples illustrate the invention:

Example 1

13.4 grams of adipic acid are melted together with 21.6 grams of ortho-aminophenol and the resulting product is distilled. 3 grams of 1:4-dioxazole butane thus obtained are converted into the alkyl iodide compound, for instance into the ethiodide in the usual manner. This is condensed in pyridine with orthoformic acid ethyl ester at 120° C. On cooling the mixture a blue-red dyestuff is precipitated. When recrystallized from methanol this dyestuff is obtained in the form of small felted needles. A methanol solution of the dyestuff shows an absorption maximum of 535m$\mu$.

When added to a silver halide emulsion the dyestuff sensitizes the emulsion for a range of 500–620m$\mu$ with a maximum at 570m$\mu$.

Example 2

16 grams of pimelic acid are melted with 21.6 grams of ortho-aminophenol and the resulting product is distilled. The dioxazole pentane thus obtained is converted into the alkyl iodide compound. 5.9 grams of this compound are condensed with ortho-formic acid ethyl ester in pyridine at 120° C. to produce the dyestuff. When recrystallized from methanol the dyestuff forms thick red crystals. A methanol solution of the dyestuff shows an absorption maximum at 505m$\mu$.

When added to a silver halide emulsion the dyestuff sensitizes the emulsion for the region 490–590m$\mu$ with a maximum at 575m$\mu$.

Example 3

24.8 grams of ortho-aminothiophenol are melted with 13.4 grams of adipic acid and the resulting product is distilled. 3.5 grams of the dibenzthiazole butane thus obtained are converted into the alkyl iodide compound and the latter is condensed for 1 hour at 110° C. with ortho-formic acid ethyl ester in pyridine. On cooling bluish needles are precipitated which may be recrystallized from alcohol. The dyestuff is useful as a sensitizer.

When added to a silver halide emulsion the dyestuff sensitizes the emulsion to a region from 640–680m$\mu$ with a maximum at 640m$\mu$.

What we claim is:

1. A process of manufacturing polymethine dyes which comprises condensing with the application of heat a compound selected from the group consisting of ortho-aminophenols, ortho-aminothiophenols and ortho-aminoselenophenols with a dibasic organic acid containing 3 to 8 carbon atoms, converting the product thus obtained into a quaternary salt and condensing said salt of the formula

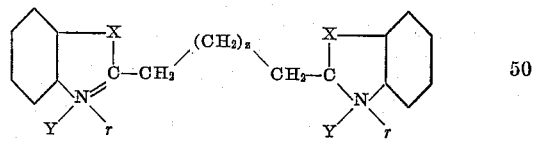

wherein
X=a member selected from the group consisting of oxygen, sulfur and selenium,
Y=an anion,
Z=a whole number from 1 to 6,
r=alkyl,
with an ortho-ester of an organic acid.

2. A dye corresponding with the formula

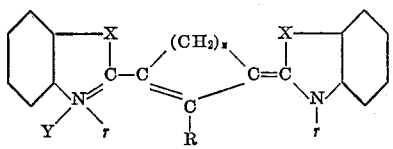

wherein
X=a member selected from the group consisting of oxygen, sulfur and selenium,
Y=an anion,
Z=a whole number from 1 to 6,
r=alkyl,
R=a member selected from the group consisting of hydrogen and methyl.

3. A process of manufacturing polymethine dyes which comprises melting together adipic acid and ortho-aminophenol, distilling the resulting product, converting the resulting 1.4-dioxazole butane into the ethiodide, and condensing this with ortho-formic acid ethyl ester at 120° C. in pyridine.

4. A process of manufacturing polymethine dyes which comprises melting together pimelic acid and ortho-aminophenol, distilling the resulting product, converting the resulting 1.4-dioxazole pentane into the ethiodide, and condensing this with ortho-formic acid ethyl ester at 120° C. in pyridine.

5. A process of manufacturing polymethine dyes which comprises melting together adipic acid and ortho-aminothiophenol, distilling the resulting product, converting the resulting 1.4-dibenzthiazole butane into the ethiodide, and condensing this with ortho-formic acid ethyl ester at 120° C. in pyridine.

6. The dye

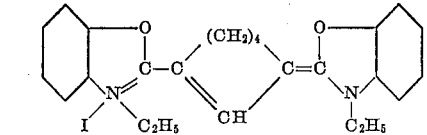

7. The dye

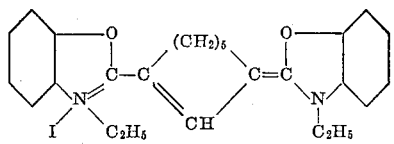

8. The dye

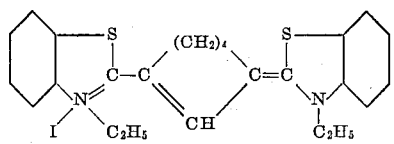

GUSTAV WILMANNS.
WILHELM SCHNEIDER.